(12) United States Patent
Takasu

(10) Patent No.: US 8,037,986 B2
(45) Date of Patent: Oct. 18, 2011

(54) ONE-WAY CLUTCH OF ROLLER TYPE FOR USE IN STARTER FOR MOTOR BIKE

(75) Inventor: Yasuhide Takasu, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 385 days.

(21) Appl. No.: 12/419,323

(22) Filed: Apr. 7, 2009

(65) Prior Publication Data

US 2009/0277739 A1 Nov. 12, 2009

(30) Foreign Application Priority Data

May 9, 2008 (JP) .................................. 2008-123683

(51) Int. Cl.
*F16D 3/34* (2006.01)
*F16D 11/06* (2006.01)
*F16D 13/04* (2006.01)
*F16D 15/00* (2006.01)
*F16D 41/06* (2006.01)
*F16D 23/00* (2006.01)
*F16D 43/00* (2006.01)

(52) U.S. Cl. .................. 192/45; 192/113.32; 74/7 C

(58) Field of Classification Search ............. 192/113.32, 192/45

See application file for complete search history.

(56) References Cited

U.S. PATENT DOCUMENTS

| 3,084,774 | A  | * | 4/1963  | Liang          | 192/44  |
|-----------|----|---|---------|----------------|---------|
| 3,104,744 | A  | * | 9/1963  | Wade           | 192/45  |
| 3,547,238 | A  | * | 12/1970 | Harmon         | 192/45  |
| 3,750,782 | A  | * | 8/1973  | Costantini et al. | 192/45 |
| 6,679,364 | B2 | * | 1/2004  | Muramatsu et al. | 192/46 |
| 7,861,836 | B2 | * | 1/2011  | Shirataki et al. | 192/45 |
| 2004/0226797 | A1 | * | 11/2004 | Yasui et al. | 192/35 |
| 2005/0217959 | A1 | * | 10/2005 | Iga et al.   | 192/45 |
| 2007/0267264 | A1 | * | 11/2007 | Pederson     | 192/45 |
| 2010/0108455 | A1 | * | 5/2010  | Shirataki et al. | 192/45 |

FOREIGN PATENT DOCUMENTS

JP 5-44615 A 2/1993

* cited by examiner

*Primary Examiner* — David D Le
*Assistant Examiner* — Lillian Nguyen
(74) *Attorney, Agent, or Firm* — Miles & Stockbridge P.C.

(57) ABSTRACT

A one-way clutch of roller type comprises an outer race having pockets provided at their inner faces with cam surfaces, an inner race spaced inwardly from the outer race in a radial direction and rotatably disposed in concentric with the outer race and having an annular outer peripheral track surface, a plurality of rollers disposed in the pockets and adapted to transmit torque between the outer race and the inner race when engaged by the cam surfaces, and accordion springs disposed in the pockets and adapted to bias the rollers toward engagement directions with respect to the cam surface, and is characterized in that one ends of the accordion springs are secured to axial end faces of the outer race.

4 Claims, 3 Drawing Sheets

ONE-WAY CLUTCH OF ROLLER TYPE FOR USE IN STARTER FOR MOTOR BIKE

BACKGROUND OF THE INVENTION

1. Field of the Invention

The present invention relates to a one-way clutch of roller type for use in a torque transmitting element or a back stopper in a driving apparatus of a motor vehicle, industrial machines and the like, for example.

2. Related Background Art

In general, a one-way clutch of roller type is comprised of an outer race, an inner race disposed in concentric with the outer race, a plurality of rollers disposed between an outer peripheral surface of the inner race and inner peripheral cam surfaces of the outer race and adapted to transmit torque, and springs contacted with idle rotation sides of the rollers.

With this arrangement, in the one-way clutch, the inner race is designed so as to be rotated only in one direction with respect to the outer race by means of a cam mechanism constituted by the rollers and the cam surfaces. That is to say, the inner race is designed so that it is idly rotated relative to the outer race in one direction, and on the other hand, it applies rotational torque to the outer race through the cam mechanism only in an opposite direction.

In the one-way clutch of roller type, to obtain positive engagement, the rollers as torque transmitting members and the springs for biasing the rollers are disposed in respective pockets provided in the outer race or the inner race.

In particular, in a one-way clutch of roller type of a motor bike, since the number of rollers is small (for example, three or six), if the respective rollers are not engaged positively, a design torque capacity may not be maintained. Thus, it is important to positively remove foreign matters and the like which would affect a bad influence upon engaging performance of the roller.

In the one-way clutch used as a stator of a motor bike, as disclosed in FIGS. 5 and 8 of Japanese Patent Application Laid-open No. 5-44615 (1993), a side plate provided at its inner diameter portion with splines is bolted to an outer race of the one way-clutch of roller type.

Further, to lubricate the one-way clutch of roller type, there has been proposed an oil lubricating system as disclosed in the above-mentioned Japanese Patent Application Laid-open No. 5-44615 (1993) or a one-way clutch in a cry condition without any oil lubrication. Since the one-way clutch of roller type used as the starter of the motor bike is used under a high speed rotation and great vibration condition and a condition in which environment regarding powder dust is severe, dust including worn powder is apt to be accumulated in the one-way clutch of roller type.

Since foreign matters such as dust accumulated in the one-way clutch of roller type also affect a bad influence upon the engaging ability, it is desirable to remove such foreign matters. Further, there is need for providing cheaper one-way clutch of roller type used as a starter.

SUMMARY OF THE INVENTION

Accordingly, an object of the present invention is to provide a one-way clutch of roller type having a side plate provided at its inner diameter portion with splines, in which reliability in an engaging ability can be enhanced and, at the same time, a low cost can be achieved.

To achieve the above object, the present invention provides a one-way clutch of roller type comprising an outer race having pockets provided at their inner peripheries with cam surfaces, an inner race arranged in an inner diameter side of the outer race coaxially, a plurality of rollers disposed in the pockets and adapted to transmit torque between the outer race and the inner race when engaged by the cam surfaces, a holder having a cylindrical portion with windows for holding the rollers and a flange portion extending outwardly from the cylindrical portion in the radial direction and fitted into a stepped portion provided in the inner diameter side of the outer race and rotatable relative to the outer race, springs disposed in the pockets between the outer race and the rollers and having one ends secured to the outer race and adapted to bias the rollers toward engagement directions with respect to the cam surfaces, and a side plate provided at its inner diameter portion with spline grooves and secured to a side surface of the outer race near the stepped portion by means of rivets inserted into a plurality of axial through holes provided in the outer race, and wherein the side plate has through holes through which the rivets extend and foreign matter discharging holes for removing foreign matters out of the clutch.

Further, preferably, the foreign matter discharging holes are located at positions where the foreign matter discharging holes are opposed to large diameter portions of the pockets and the side surface of the outer race, and the rivets do not pass through the outer race completely at those positions.

In addition, preferably, a pitch circle diameter of the through holes through which the rivets for securing the side plate to the outer race pass differs from a pitch circle diameter of the foreign matter discharging holes of the side plate.

Further, preferably, each foreign matter discharging hole has a circular cross-section.

According to the one-way clutch of roller type of the present invention, the following effects can be obtained.

With the flanged holder having the cylindrical portion including the windows, since the holder is prevented from being dislodged toward an opposite side of the side plate and the rollers are housed in the windows of the holder, the rollers can also be prevented from being dislodged. As a result, it is not required to provide or use a hub plate for preventing the dislodgement of the rollers as disclosed in the above-mentioned Japanese Patent Application Laid-open No. 5-44615 (1993), thereby reducing the cost of the one-way clutch of roller type.

Further, since the side plate has the foreign matter discharging holes located at positions corresponding to the pockets of the outer race, the foreign matters can also be discharged more smoothly from and through the side plate, and, thus, the foreign matters can be prevented from being accumulated in the one-way clutch of roller type, thereby enhancing reliability in the engaging ability of the one-way clutch of roller type.

The foreign matter discharging holes provided in the side plate serve to determine circumferential phases of punching positions of a press when the side plate is secured to the outer race through the rivets by means of the press. Thus, the foreign matter discharging holes can be utilized as guide holes for positioning guide pins provided on the press. Further, since the foreign matter discharging hole has the circular cross-section, the working and positioning of the foreign matter discharging hole can be facilitated and the guide pin can be easily formed.

Further, the foreign matter discharging hole is located at a position where it is opposed to the large diameter portion of the pocket of the outer race and the side surface of the outer race, and the rivet does not pass through the outer race completely at that position. With this arrangement, the error in which the side plate is secured to the outer race by the rivets at the positions of the foreign matter discharging holes can be prevented. Further, the foreign matters can be discharged from the pockets smoothly through the large diameter portions of the pockets having greatest diameters by a centrifugal force generated by the rotation of the outer race.

By designing so that the pitch circle diameter of the rivet through holes provided in the outer race differs from the pitch circle diameter of the foreign matter discharging holes of the side plate, when the rivets are arranged on the rivet guide plate and the side plate is set, the error in which the rivets are inserted into the foreign matter discharging holes of the side plate can be prevented, thereby enhancing the workability and preventing the erroneous assembling.

In the present invention, since the through holes opposed to the through holes of the outer race are provided in the side plate and the side plate is secured to the outer race by caulking the rivets by means of the press after the rivets are passed through the outer race at the side of the side plate, in comparison with a case where a side plate is secured by bolts as disclosed in the above-mentioned Japanese Patent Application Laid-open No. 5-44615 (1993), it is nor required to perform a tapping operation with respect to the side plate.

Incidentally, the term "foreign matters" used in the specification may include metal powder, worn powder, dust, cut powder and the like generated by sliding contact and/or engagement between parts. Further, the foreign matters also include minute dust carried by lubrication oil. The foreign matters also include all of matters generated in the one-way clutch of roller type and matters entered from outside.

Further features of the present invention will become apparent from the following description of exemplary embodiment with reference to the attached drawings.

DETAILED DESCRIPTION OF THE INVENTION

Now, an embodiment of the present invention will be fully explained with reference to the accompanying drawings. Incidentally, it should be noted that the embodiment which will be described below is merely an example and other alterations and modifications can be made.

Figure 1:
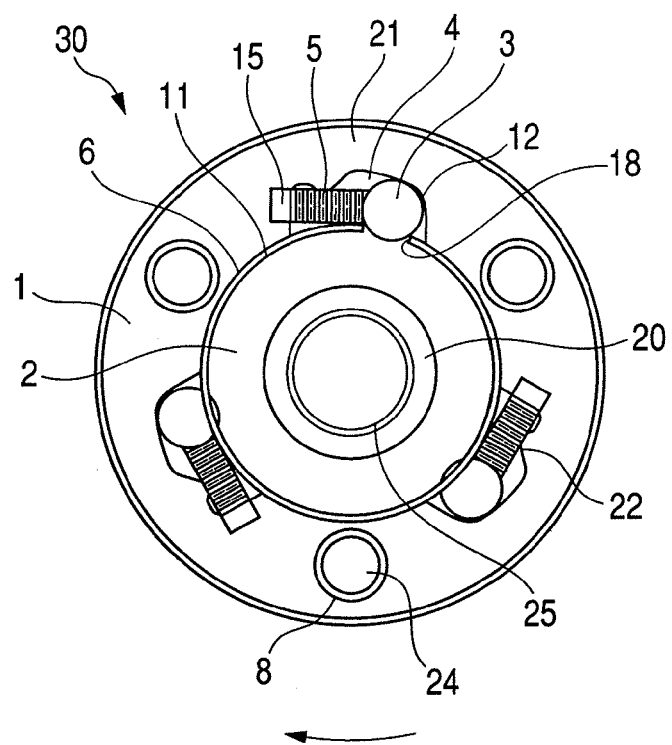
FIG. 1 is a front view showing a one-way clutch of roller type according to the present invention.
Figure 2:
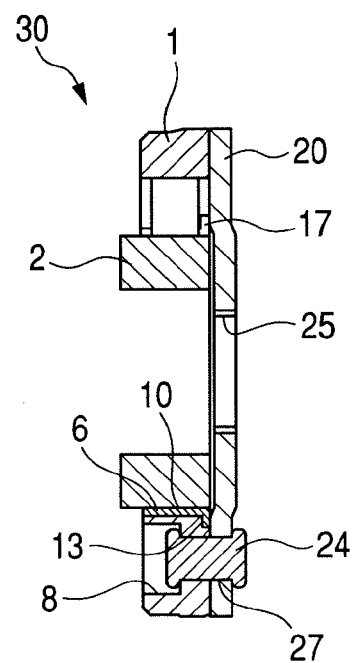
FIG. 2 is an axial sectional view taken along the line X-X of FIG. 3.
Figure 3:
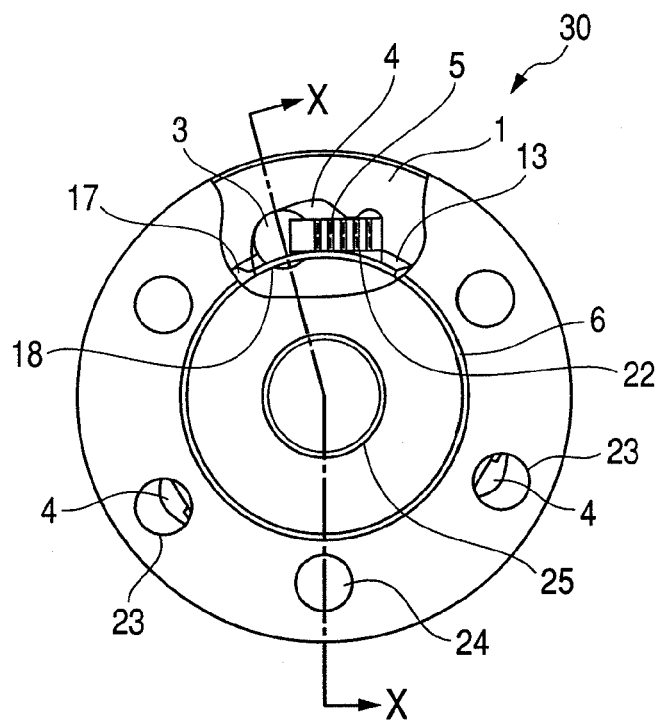
FIG. 3 is a front view showing a one-way clutch of roller type looked at from an opposite side of FIG. 1, with a side plate broken.

FIG. 1 is a front view showing a one-way clutch of roller type according to the present invention, and FIG. 2 is an axial sectional view taken along the line X-X of FIG. 3. FIG. 3 is a front view showing the one-way clutch of roller type looked at from an opposite side of FIG. 1, with a side plate partially broken.

FIGS. 1 to 3 show a condition that rollers are engaged by cam surfaces, i.e. a condition that the one-way clutch is locked. Incidentally, from this condition, when an outer race is rotated in a direction shown by the arrow, the one-way clutch is unlocked so that it can be idly rotated.

As shown in FIG. 1, a one-way clutch 30 of roller type comprises an annular outer race 1 provided at its inner periphery with pockets 4 formed as recesses having cam surfaces 12, an inner race 2 spaced inwardly from the outer race 1 in a radial direction and rotatable relative to the outer race and disposed in concentric with the outer race and having an annular outer peripheral track surface 11, and a plurality of rollers 3 disposed in the pockets 4 and adapted to transmit torque between the outer peripheral track surface 11 of the inner race 2 and the cam surfaces 12.

There are three pockets 4 provided at the inner diameter side of the outer race 1, which pockets are disposed equidistantly along a circumferential direction. Further, three stepped rivet holes 8 used for securing a side plate 20 (described later) to the outer race 1 and extending through the outer race in an axial direction are also disposed equidistantly along the circumferential direction. As shown in FIG. 1, the pockets 4 and the rivet holes 8 are arranged alternately and equidistantly along the circumferential direction. Further, it should be noted that the number of the pockets 4 can be set to be four or more, for example, in accordance with the magnitude of the torque.

As shown in FIGS. 1 to 3, the one-way clutch 30 includes a holder 6 for holding the rollers 3, and the holder 6 has a cylindrical portion 10 and an annular flange portion 17 extending radially outwardly from an axial one end of the cylindrical portion 10. Further, the holder 6 has windows 18 extending therethrough in the radial direction, the number of which corresponds to the number of the rollers 3.

Each window 18 provided in the cylindrical portion 10 of the holder 6 extends through the cylindrical portion completely in the radial direction, but, in the axial direction, both ends of the window near the flange portion 17 and remote from the flange portion 17 are closed. That is to say, the roller 3 is seated in a substantially rectangular window 18 and is supported by four sides of the window 18.

As shown in FIG. 2, an annular stepped portion 13 is provided on an axial edge portion of the inner peripheral surface of the outer race 1, and the flange portion 17 of the holder 6 is engaged by the stepped portion 13. An axial depth of the stepped portion 13 is slightly greater than a thickness of the flange portion 17 so that, when the flange portion 17 is engaged by the stepped portion 13, an axial end face of the outer race 1 (end face opposite to an axial end face 21) becomes substantially in flush with an axial end face of the flange portion 17. Further, an outer diameter of the stepped portion 13 is slightly greater than an outer diameter of the flange portion 17 of the holder 6 so that the flange portion 17 is fitted in the stepped portion with a predetermined clearance. In this way, the holder 6 can be rotated relative to the outer race 1.

Further, as shown in FIG. 1 and FIG. 3, the one-way clutch 30 of roller type includes accordion springs 5 disposed in the corresponding pockets 4 and adapted to bias the rollers 3 toward engagement directions with respect to the cam surfaces 12.

One end i.e. tab 15 of each accordion spring 5 is locked to the axial end face 21 of the outer race 1, as shown in FIG. 1. Further, the other end of the accordion spring 5 is pinched between an axial end face of the roller 3 and the flange portion 17 of the holder 6.

As shown in FIG. 1 and FIG. 2, the accordion spring 5 includes a bellows portion 22 in the form of a bellows bent in the axial direction of the accordion spring 5. The bellows portion 22 can be expanded and contracted so as to apply a biasing force to the roller 3 so that the roller 3 is engaged by the cam surface 12.

The tab 15 of the accordion spring 5 is secured to the axial end face 21 of the outer race 1, for example, by welding, spot welding, bonding, soldering or the like.

Since the accordion spring 5 is secured to the axial end face 21 of the outer race 1, a relative position between the accordion spring 5 and the outer race 1 is not almost changed. Thus, wear and/or damage of the springs caused by sliding contact between the spring and the inner diameter portion of the outer race and the outer diameter portion of the holder or the track surface of the inner race can be prevented.

Further, the movement of the accordion spring 5 during the operation thereof is not affected by the outer race 1 and/or the holder 6, so that a stable and smooth movement can be achieved. Thus, the engaging ability of the roller can be enhanced.

Next, the side plate 20 will be fully described. The side plate 20 is secured to the outer race 1 from a side of the stepped portion 13 of the outer race by means of rivets 24 inserted into a plurality of rivet holes 8 provided in the outer race 1 and extending therethrough in the axial direction. Further, the side plate 20 is provided at its inner diameter portion with spline grooves 25. A crankshaft of an engine (not shown) is engaged by the spline grooves 25.

As can be seen from FIG. 2, the side plate 20 has a predetermined clearance with respect to an axial end face of the inner race 2 at the inner diameter side. The spline grooves 25 are disposed in a cavity at an inner diameter side of the inner race 2. The side plate 20 is secured to the outer race 1 by the rivets 24 in such a manner that the flange portion 17 of the holder 6 is pinched between the side plate and the stepped portion 13 of the outer race 1. Incidentally, the inner race 2 is engaged by a pinion of a motor for a starter (not shown).

As shown in FIG. 3, in the side plate 20, three through holes 27 through which the rivets extend and three foreign matter discharging holes 23 for removing foreign matters out of the clutch are arranged alternately along the circumferential direction. The through holes 24 are provided in such a manner that circumferential phases of the through holes become the same as circumferential phases of the rivet holes 8 provided in the outer race 1. Further, the foreign matter discharging holes 23 each having a circular cross-section are provided in such a manner that circumferential phases of the foreign matter discharging holes become the same as circumferential phases of large diameter portions of the pockets 4. Accordingly, when the side plate 20 is secured to the outer race 1, the side plate is secured to the outer race by the rivets 24 in a condition that the through holes 27 are opposed to the rivet holes 8. A method for securing the side plate will be described later with reference to FIG. 6.

In a condition that the side plate 20 is secured to the outer race 1, portions of the pockets 4 are visible through the foreign matter discharging holes 23. In FIG. 3, portions of the pockets 4 can be seen through lower left and right foreign matter discharging holes 23. The other one foreign matter discharging hole 23 is not visible in FIG. 3 because it is broken away.

Figure 4:
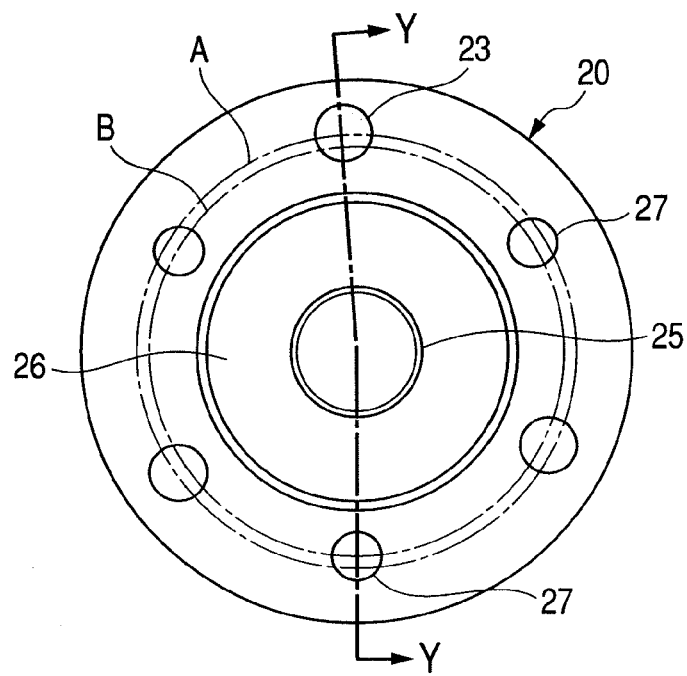
FIG. 4 is a front view of the side plate.
Figure 5:
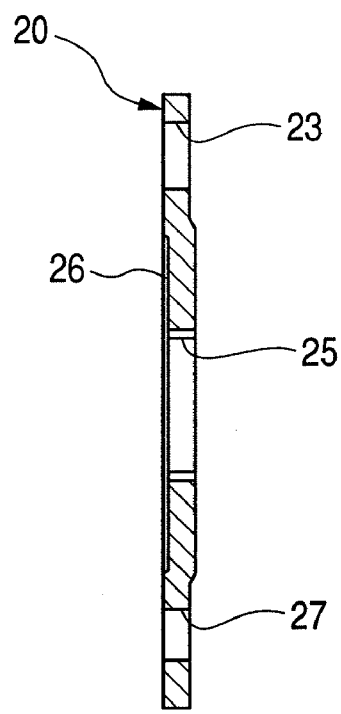
FIG. 5 is an axial sectional view taken along the line Y-Y of FIG. 4.

Next, a construction of the side plate 20 will be explained with reference to FIGS. 4 and 5. FIG. 4 is a front view of the side plate and FIG. 5 is an axial sectional view taken along the line Y-Y in FIG. 4. As shown in FIG. 4, the side plate 20 is provided with the through holes 27 and the foreign matter discharging holes 23 which extend through the side plate in the axial direction. In the illustrated embodiment, both of the foreign matter discharging holes 23 and the through holes 27 have circular cross-sections, but a diameter of the foreign matter discharging hole 23 is greater than that of the through hole.

A central portion of the side plate 20 extends through the side plate to form a cavity, within which the spline grooves 25 are provided as mentioned above. An annular recessed portion 26 is provided around the spline grooves 25 in a radial outward direction. As shown in FIG. 5, the recessed portion 26 has a predetermined axial depth and a predetermined clearance is provided between the recessed portion and the inner race 2.

A pitch circle diameter of the foreign matter discharging holes 23 differs from a pitch circle diameter of the through holes 27, and, in the illustrated embodiment, a pitch circle A of the foreign matter discharging holes 23 is greater than a pitch circle B of the through holes 27. Accordingly, a pitch circle of the rivet holes 8 of the outer race 1 opposed to the through holes 27 in the axial direction is substantially the same as the pitch circle B of the through holes 27, and the pitch circle of the foreign matter discharging holes 23 is greater. The purpose of this arrangement is to enhance workability when the side plate 20 is assembled and to prevent erroneous assembling, as will be described later. Further, by designing so that the diameter of the foreign matter discharging hole become greater than the diameter of the through hole 27, the identifying of the through holes (from the foreign matter discharging holes) can be more facilitated when the rivets are inserted into the side plate, thereby further enhancing the workability and further preventing the erroneous assembling, and enhancement of foreign matter discharging ability can also be expected.

Figure 6:
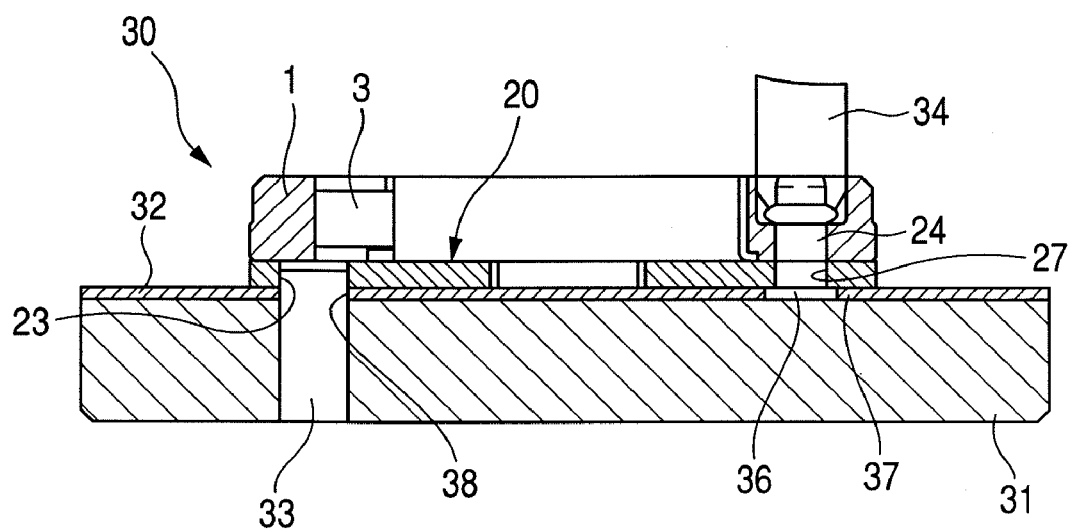
FIG. 6 is a sectional view for explaining a method for assembling and securing the side plate to an outer race.

Next, the method for assembling and securing the side plate 20 to the outer race 1 will be explained with reference to FIG. 6. In the one-way clutch 30 of roller type, the assembling of the side plate 20 to the outer race 1 is performed as follows. First of all, a rivet guide plate 32 having holes 37 and 38 corresponding to the foreign matter discharging holes 23 and the through holes 27 respectively is rested on a caulking base 31 having a flat upper surface.

In a condition that heads 36 of the rivets 27 are fitted in the holes 37 of the rivet guide plate 32, the side plate 20 and the outer race 1 are overlapped with the rivet guide plate 32 so that the rivets 24 are inserted into the through holes 27 of the side plate 20 and the rivet holes 8 of the outer race 1, respectively.

Rivet pressing pins 34 are fitted in the rivet holes 8 of the outer race 1 to press and caulk the rivets 24. When the rivet pressing pins 34 is lowered downwardly in FIG. 6 by means of a press (not shown), the other ends of the rivets 24 is caulked, thereby securing the side plate 20 to the outer race 1. In FIG. 6, the end of the rivet 24 before the caulking is shown by the broken line.

The foreign matter discharging holes 23 provided in the side plate 20 serve to determine circumferential phases of the rivet pressing pins 34 when the side plate 20 is secured to the outer race 1 through the rivets 24 by means of the press. Thus, the foreign matter discharging holes can be utilized as guide holes for positioning guide pins 33 provided on the press. FIG. 6 shows a condition that the guide pin 33 is fitted in the foreign matter discharging hole 23. Further, since the foreign matter discharging hole 23 has the circular cross-section, the working and positioning of the foreign matter discharging hole 23 can be facilitated and the guide pin 33 can be easily formed.

Further, the foreign matter discharging hole 23 is located at a position where it is opposed to the large diameter portion (side of the cam surface 12) and the side surface of the outer race, and the rivet does not pass through the outer race 1 completely at that position. With this arrangement, the error in which the side plate 20 is secured to the outer race 1 by the rivets 24 at the positions of the foreign matter discharging holes 23 can be prevented. Further, the foreign matters can be discharged from the pockets 4 smoothly through the large diameter portions of the pockets 4 having greatest diameters by a centrifugal force generated by the rotation of the outer race.

As mentioned above, by designing so that the pitch circle diameter of the rivet holes 8 provided in the outer race 1 differs from the pitch circle diameter of the foreign matter discharging holes 23 of the side plate 20, when the rivets 24 are arranged on the rivet guide plate 32 and the side plate 20 is set, the error in which the rivets 24 are inserted into the foreign matter discharging holes 23 of the side plate 20 can be prevented, thereby enhancing the workability and preventing the erroneous assembling.

Although the present invention can be used as a part such as a torque transmitting element or a back stopper in a driving apparatus of a motor vehicle, an industrial machine and the like, an excellent effect can be achieved particularly when the present invention is used in a motor bike.

While the present invention has been described with reference to exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-123683, filed May 9, 2008, which is hereby incorporated by reference in its entirety.

What is claimed is:

1. A one-way clutch of roller type comprising:
    an outer race having pockets provided at their inner peripheries with cam surfaces;
    an inner race arranged in an inner diameter side of said outer race coaxially;
    a plurality of rollers disposed in said pockets and adapted to transmit torque between said outer race and said inner race when engaged by said cam surfaces;
    a holder having a cylindrical portion with windows for holding said rollers and a flange portion extending outwardly from said cylindrical portion in the radial direction and fitted into a stepped portion provided in the inner diameter side of said outer race and rotatable relative to said outer race;
    springs disposed in said pockets between said outer race and said rollers and having one ends secured to said outer race and adapted to bias said rollers toward engagement directions with respect to said cam surfaces; and
    a side plate provided at its inner diameter portion with spline grooves and secured to a side surface of said outer race near said stepped portion by means of rivets inserted into a plurality of axial through holes provided in said outer race;
    and wherein
    said side plate has through holes through which said rivets extends and foreign matter discharging holes for removing foreign matters out of said clutch.

2. A one-way clutch of roller type according to claim 1, wherein said foreign matter discharging holes are located at positions where said foreign matter discharging holes are opposed to large diameter portions of said pockets and said side surface of said outer race, and said rivets do not pass through said outer race completely at those positions.

3. A one-way clutch of roller type according to claim 1, wherein a pitch circle diameter of said through holes through which said rivets for securing said side plate to said outer race pass differs from a pitch circle diameter of said foreign matter discharging holes of said side plate.

4. A one-way clutch of roller type according to claim 1, wherein said foreign matter discharging holes have circular cross-sections.

* * * * *